Feb. 20, 1968    L. J. WOLF    3,369,825
ADJUSTABLE FIFTH WHEEL MOUNT
Filed April 27, 1966    2 Sheets-Sheet 1

INVENTOR:
LLOYD J. WOLF
BY Bedell & Burgess
ATTORNEYS

INVENTOR:
LLOYD J. WOLF
BY Bedell & Burgess
ATTORNEYS

United States Patent Office 3,369,825
Patented Feb. 20, 1968

3,369,825
ADJUSTABLE FIFTH WHEEL MOUNT
Lloyd J. Wolf, 2425 Irving Blvd., Dallas, Tex. 75207
Filed Apr. 27, 1966, Ser. No. 545,599
4 Claims. (Cl. 280—407)

ABSTRACT OF THE DISCLOSURE

An adjustable mount for a fifth wheel in which the fifth wheel trunnion blocks are supported on plates toothed along one of their sides and slidably mounted in upwardly open channel shaped guide members with inwardly directed flanges on their sides completely overlying the toothed margin of the support plates, and a completely enclosed transversely movable locking plunger mounted on the side of the guide members adjacent the toothed side of the support plate with only its operating plunger protruding from the enclosure, which also encloses the operating spring.

---

The invention relates to highway vehicles and consists particularly in an improved adjustable mounting for fifth wheels for connecting semitrailers to tractors.

In order to permit longitudinal shifting of the load, to vary its distribution to the tractor and semitrailer wheels, numerous adjustable fifth wheel mounts have been developed.

The most common type of conventional adjustable fifth wheel mount utilizes rails with a perforated vertical web mounted on the tractor frame, the fifth wheel mount being positioned between them for longitudinal slidable movement and having spring-loaded on hydraulically actuated pins insertible in the web perforations for fixing the position of the fifth wheel longitudinally of the tractor and retractable from the web perforations to permit longitudinal shifting of the fifth wheel.

The foregoing and additional more detailed objects and advantages of the invention will be evident from the following description and the accompanying drawings, in which.

It is an object of the invention to provide an easily adjustable fifth wheel mount usable with standard fifth wheel components without any modification of the latter. A more detailed object is to provide adjustable fifth wheel mounts which can be interposed between the tractor frame and the fifth wheel trunnion blocks without modification of either or substantial increase in the height of the fifth wheel.

Figure 1:
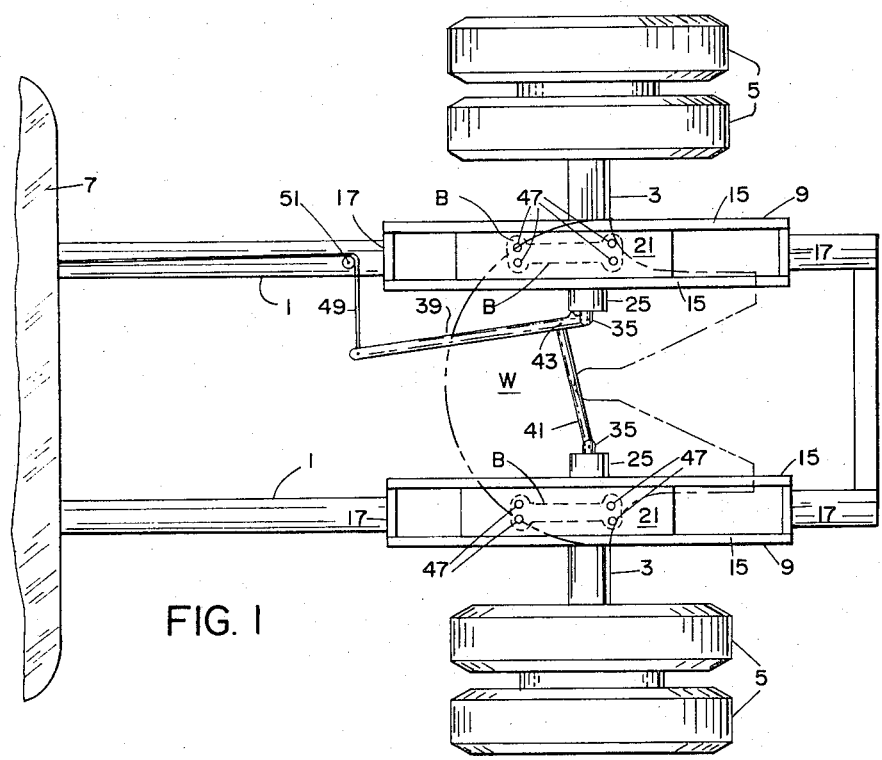
FIG. 1 is a partial plan view of my improved adjustable fifth wheel mount applied to a tractor, illustrating an operating linkage.
Figure 2:
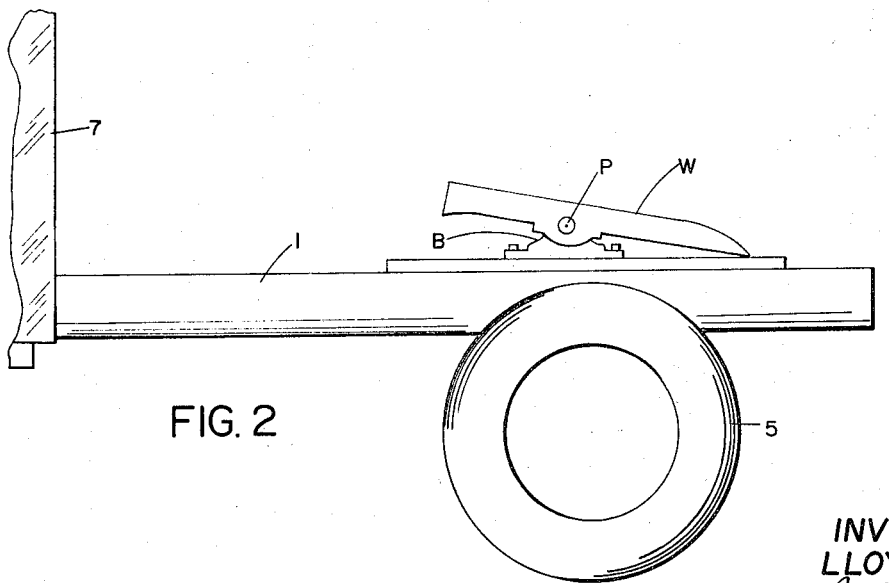
FIG. 2 is a side elevation of the construction illustrated in FIG. 1.
Figure 3:
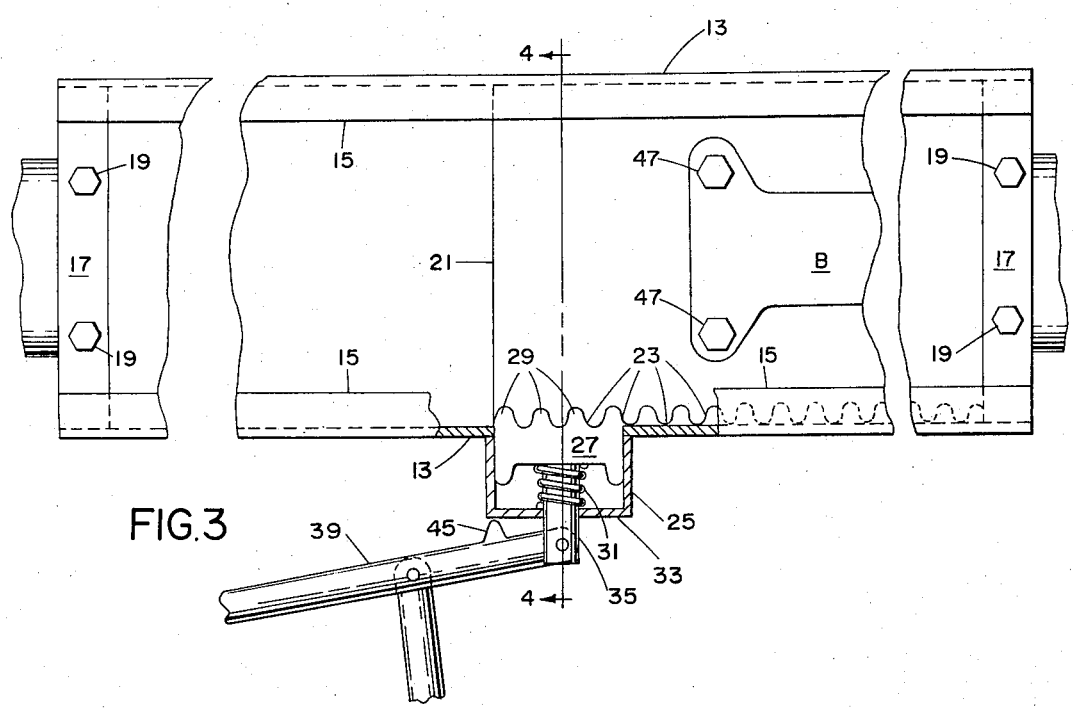
FIG. 3 is an enlarged top view, partially horizontally sectioned of a trunnion block mount and lock.
Figure 4:
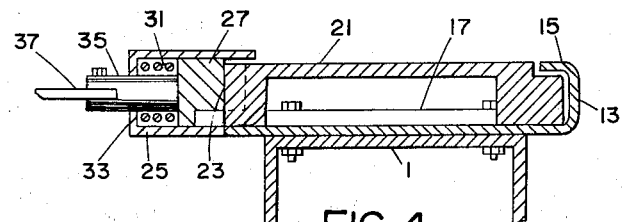
FIG. 4 is a transverse vertical sectional view along line 4—4 of FIG. 3.

In FIGS. 1 and 2, the numeral 1 indicates transversely spaced longitudinally extending frame members of a highway tractor, supported on the usual rear axle and dual wheels 5, and having a cab 7.

The fifth wheel assembly comprises fifth wheel W, trunnion pins P and trunnion blocks B, all of which parts may be of conventional, commercially obtainable construction.

To make possible shifting of the fifth wheel assembly WPB longitudinally of the tractor, a pair of upwardly open shallow channel guide members 9 having flat horizontal webs 11 secured to the tops of tractor frame members 1, upstanding inner and outer flanges 13, with horizontal rebent terminals 15. At its ends each channel 9 is provided with a stop bar 17, which may be secured to channel web 11 by bolts 19, which may also be utilized to secure the channel to tractor frame member 1.

For supporting trunnion blocks B, plates 21 are slidably mounted in channel guide members 9 with their longitudinal margins adjacent flanges 13 and underlying flange rebent terminals 15. For locking in selected positions longitudinally of guide members 9, the inner margins of plates 21 are provided with teeth 23, and, at its midpoint inner flange 13 is cut away to provide communication with a rectangular housing 25 in which is transversely slidably mounted a lock 27 formed with teeth 29 adapted to mesh with slider plate teeth 23 and lock the latter in any selected position lengthwise of guide member 9 when so meshed. Slider plates 21 are of slightly greater length than half the distance between opposite stop bars 17 so that some of their teeth 23 will be opposite lock teeth 29 at all times, even when the slider plates are in their extreme forward and rear positions.

Toothed lock member 27 is biased toward plate 21 by a coil spring 31 which is seated against the end wall 33 of lock housing 25 so as to maintain lock teeth 29 in engagement with slider plate teeth 23.

For retracting lock block 27 from locking engagement with the slider plate and thus permitting movement of the latter lock block 27 is provided with a stem 35 extending transversely of the vehicle from the back of the lock block through spring 31 and through end wall 33 of lock block housing 25. The protruding end of stem 35 is slotted as at 37.

A lock release mechanism comprises a lever 39 pivotally secured in slot 37 in the right hand lock stem 35 and extending forward therefrom generally longitudinally of the vehicle and a tension element, bar 41, pivotally secured in slot 37 in the left hand lock stem and extending generally transversely of the vehicle, therefrom to a pivotal connection at 43 with lever 39 forwardly of stem 35. Lever 39 is formed with a boss 44 engageable with the end wall 33 of the right hand lock block housing to provide a fulcrum whereby, by rotating lever 39 clockwise about this fulcrum, lever 39 will retract right hand lock 27 and will cause bar 41 to retract left hand lock 27 from locking engagement with their respective slider plates 21.

Slider plates 21 are formed with pads on their upper surfaces, to which are secured, trunnion blocks B, by means of bolts 47, and trunnion blocks B are connected to each other, and support trunnion pins P and fifth wheel W, so that when locks 27 are released, the entire fifth wheel assembly WPB is free to move lengthwise of the tractor, and when locks 27 are in engagement with slider plates 21, the fifth wheel assembly is correspondingly locked against such movement.

To facilitate release of locks 27 by the driver while in the tractor cab, a cable 49 is connected to the forward end of lever 39, extending transversely therefrom around a pulley 51 on the right hand frame member 1, to cab 7, where the driver can pull on it to release the locks, and then, by moving the tractor forward or rearward, with the trailer brakes locked, selectively position fifth wheel W. When the desired position of the fifth wheel longitudinally of the tractor is reached, by releasing cable 49, locks 27 will be permitted to engage slider plates 21 to lock the latter and the fifth wheel assembly mounted thereon in the desired position.

Figure 5:
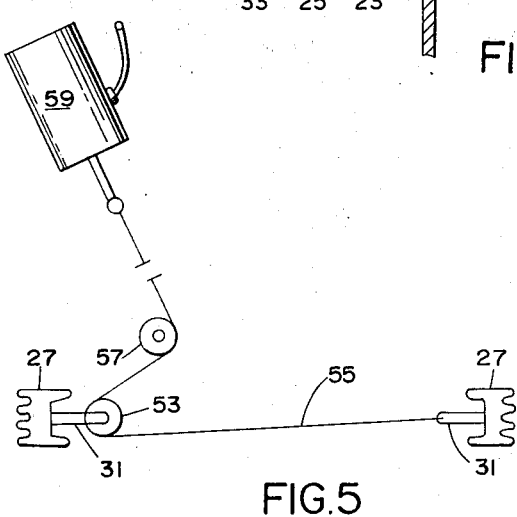
FIG. 5 is a schematic view of a modified operating arrangement.

FIG. 5 illustrates a modified system for selectively releasing locks 27 from engagement with slider plates 21. With this arrangement, one of the lock block stems 31 mounts a pulley 53, and a cable 55 is secured at one end to stem 31 or the other lock block, extends transversely of the tractor, around pulley 57 to a connection with the piston rod of an air, or other fluid-actuated cylinder 59 controlled by the driver.

The details of the fifth wheel mount described above may be varied substantially without departing from the spirit of the invention and the exclusive use of those modifications as come within the scope of the appended claims is contemplated.

What is claimed is:

1. An adjustable mount for a fifth wheel trunnion block comprising an elongated guide member of upwardly open channel cross section, a trunnion block support plate slidable lengthwise of said guide member and having teeth along one of its sides, said guide member having upright sides bent inwardly along their upper margins, said trunnion block support plate being positioned between said upright sides and having its side marginal portions underlying the inwardly bent portions of both said guide member sides and for a substantially greater distance transversely inwardly than the depth of said teeth on the toothed side of said support plate and an element movable transversely of said guide member intermediate its ends and having teeth engageable with said plate teeth for preventing movement of said plate lengthwise of said guide member, said guide member upright side adjacent said teeth being apertured intermediate its ends to admit said transversely movable element and being formed with a housing completely enclosing said transversely movable element, and a stem projecting from said transversely movable element in the opposite direction from said teeth and through said housing, a spring surrounding said stem and compressed between said housing and said transversely movable element for resiliently biasing said transversely movable element into meshing engagement with said trunnion block support plate.

2. An adjustable mount for a fifth wheel on a vehicle frame comprising a pair of parallel upwardly facing elongated channel-like guide members secured to the vehicle frame members and extending lengthwise thereof, elements movable longitudinally of said channels, a fifth wheel assembly secured to said longitudinally movable elements, teeth on said longitudinally movable along their inner margins, elements mounted on said guide members intermediate their ends for movement transversely of the vehicle and having teeth engageable with the teeth on said longitudinally movable elements, means resiliently biasing said transversely movable elements into toothed engagement with said longitudinally movable elements, means for selectively simultaneously disengaging said transversely movable elements from said longitudinally movable elements at both sides of the vehicle, said disengaging means comprising a substantially longitudinally extending lever secured at one end to one of said transversely movable elements inwardly of the associated guide member and fulcrumed intermediate its ends, and a tension member connected at one end to said lever on the opposite side of the fulcrum from said one transversely movable element and at its other end to the other transversely movable element.

3. An adjustable mount according to claim 2 including means controllable from the vehicle cab for moving said lever about its fulcrum.

4. An adjustable mount for a fifth wheel on a vehicle frame comprising a pair of parallel upwardly facing elongated channel-like guide members secured to the vehicle frame members and extending lengthwise thereof, elements movable longitudinally of said channels, a fifth wheel assembly secured to said longitudinally movable elements, teeth on said longitudinally movable elements along their inner margins, elements mounted on said guide members intermediate their ends for movement transversely of the vehicle and having teeth engageable with the teeth on said longitudinally movable elements, means resiliently biasing said transversely movable elements into toothed engagement with said longitudinally movable elements, means for selectively simultaneously disengaging said transversely movable elements from said longitudinally movable elements at both sides of the vehicle, said control means comprising a cord secured at one end to one of said transversely movable elements and extending therefrom transversely of the vehicle to said other transversely movable element, said cord being movably secured to the other of said transversely movable elements and extending generally transversely inwardly therefrom, and means for applying tension to said cord in a direction away from said last named movable element.

References Cited
UNITED STATES PATENTS

| | | | |
|---|---|---|---|
| 2,317,508 | 4/1943 | Zoder | 280—407 |
| 2,330,879 | 10/1943 | Kirksey. | |
| 2,755,104 | 7/1956 | Braunberger | 280—407 |
| 3,170,716 | 2/1965 | Walther et al. | 280—407 |
| 3,191,966 | 6/1965 | Felburn | 280—407 |

LEO FRIAGLIA, *Primary Examiner.*